United States Patent [19]

Loutfy et al.

[11] Patent Number: 4,836,998

[45] Date of Patent: Jun. 6, 1989

[54] PRODUCTION OF PARTIALLY CALCINED CARBONACEOUS REDUCTANT USING STEAM

[75] Inventors: Raouf O. Loutfy, Tucson, Ariz.; Kirk R. Weisbrod, Celina, Tex.; James C. Withers, Tucson, Ariz.

[73] Assignee: Aluminum Company of America, Pittsburgh, Pa.

[21] Appl. No.: 684,935

[22] Filed: Dec. 21, 1984

[51] Int. Cl.$^4$ .............................. C09C 1/56
[52] U.S. Cl. .................... 423/460; 423/461
[58] Field of Search .................. 423/460, 461

[56] References Cited

U.S. PATENT DOCUMENTS

| | | | |
|---|---|---|---|
| 1,984,380 | 12/1934 | Odell | 423/460 |
| 3,639,266 | 2/1972 | Battista | 423/460 |
| 3,745,104 | 7/1973 | Hou | 423/460 |
| 3,937,786 | 2/1976 | Nemecz et al. | 423/136 |
| 3,942,956 | 3/1976 | Ito | 423/461 |
| 4,061,719 | 12/1977 | Schallus et al. | 423/460 |
| 4,073,872 | 2/1978 | Willhoft | 423/496 |
| 4,225,463 | 9/1980 | Unger et al. | 423/461 |
| 4,284,607 | 8/1981 | Culleiton et al. | 423/137 |
| 4,459,274 | 7/1984 | Loutfy et al. | 423/496 |

FOREIGN PATENT DOCUMENTS 59-195517 11/1984 Japan .................. 423/460

*Primary Examiner*—John Doll
*Assistant Examiner*—Robert M. Kunemund
*Attorney, Agent, or Firm*—Daniel A. Sullivan, Jr.

[57] ABSTRACT

A process for producing an improved solid carbon reductant, which contains relatively low amounts of residual hydrocarbons and a high surface area. This improved reductant is produced by a method comprising heating carbonaceous material, such as petroleum coke, with steam in either reducing or oxidizing atmosphere to a temperature of from about 650° C. to about 1150° C. Using the improved reductant during chlorination of aluminous materials and metal or metalloid oxides will result in reducing the level of chlorinated hydrocarbon ($C_xCl_y$) production due to residual hydrogen and/or hydrocarbons.

15 Claims, No Drawings

PRODUCTION OF PARTIALLY CALCINED CARBONACEOUS REDUCTANT USING STEAM

FIELD OF INVENTION

This invention relates to a method producing an improved solid carbonaceous reductant whose use in reductive chlorination processes results in decreased levels of environmentally unacceptable chlorinated hydrocarbons ($C_xCl_y$), such as polychlorinated biphenyl (PCB), and hexachlorobenzene (HCB) in metal chlorides produced therefrom.

BACKGROUND OF THE INVENTION

The rate of carbon consumption is an important factor in a number of metallurgical processes. For example, in the production of anhydrous aluminum chloride, from aluminous raw material, as a precursor for producing aluminum, carbon or carbon monoxide is used as a reductant according to the following equations:

$$Al_2O_3 + 3/2C + 3Cl_2 \rightarrow 2AlCl_3 + 3/2CO_2 \qquad (1)$$

$$Al_2O_3 + 3CO + 3Cl_2 \rightarrow 2AlCl_3 + 3CO_2 \qquad (2)$$

The rate of reaction (2) is significantly higher than reaction (1). However, the use of carbon monoxide as a reductant in reaction (2) requires the generation of carbon monoxide from carbon. Thus, for either chlorination reaction, the activation of carbon is desirable to both increase the rate of chlorination and/or lower the reaction temperature. Carbon monoxide as a reductant results in a rapid chlorination rate and produces an $AlCl_3$ product with essentially no environmental contaminants such as chlorinated hydrocarbons including polychlorinated biphenyls (PCB's) such as decachlorobiphenyl (DCB) or hexachlorobenzene (HCB), pentachlorobenzonitrile (PCBN), pentachloropyridine (PCP) and octachlorostyrene (OCS). Its cost, however is site dependent. Moreover, use of CO requires a $C/Al_2O_3$ mole ratio of 3 which translates to about 0.67 lb C/lb Al and requires a significant gas volume to be handled resulting in higher capital cost. Solid reductants can result in stable cost regardless of site location and can result in lower off-gas volume depending on chlorination temperature.

Petroleum coke is a known source for solid carbon reductants for the chlorination of aluminous materials, such as partially calcined alumina (PCA), metal grade alumina (MGA) and partially calcined aluminum chloride hexahydrate (ACH). Green petroleum coke, i.e., uncalcined coke, is known to have a moderate level of activity. However, a serious disadvantage is that it contains significant quantities of hydrogen and hydrocarbons which are chlorinated during the chlorination process. Not only does their presence result in increased consumption of expensive unrecoverable chlorine, but the resulting chlorinated hydrocarbons contaminate the valuable product.

Petroleum coke then is typically fully calcined at temperatures of 1200°-1400° C. to remove moisture and drive off the hydrogen and hydrocarbons. However, the high temperature calcination of coke, sometimes called dead burning, produces coke with a low surface area and low activity as far as chlorination reaction kinetics are concerned.

An alternative to both carbon monoxide and fully calcined coke is the use of partially calcined coke. U.S. Pat. No. 4,284,607 to Culleiton teaches a method of producing partially calcined coke, involving calcining green petroleum coke in a nitrogen or non-oxidizing atmosphere to a partial calcination temperature of from 650° C.-900° C. U.S. Pat. No. 3,937,786 to Nemecz also discloses producing aluminum chlorides by calcining a mixture of an aluminous material and a carbon-containing reducing agent. The reducing agent specifically disclosed is a high ash containing coal which has been calcined or coked in a reducing atmosphere such as nitrogen. Both references exemplify known methods wherein the calcination of the hydrocarbon-containing carbon reductant, alone or in conjunction with the aluminous materials to be chlorinated, is in a reducing atmosphere without regard to the presence of precursors for harmful chlorinated hydrocarbons. The partially calcined coke is a relatively active reductant resulting in rapid chlorination of aluminous materials such as metal grade alumina to produce anhydrous aluminum chloride. However, the serious disadvantage of such partially calcined coke when used as a reductant for chlorination reactions is that it contains relatively high levels of residual hydrocarbons. During chlorination, utilizing such partially calcined coke as the reductant, the residual hydrocarbons will also be chlorinated to produce compounds such as polychlorinated biphenyls (PCB's), hexachlorobenzene (HCB), decachlorobiphenyl (DCB), pentachlorobenzonitrile (PCBN), pentachloropyridine (PCP), and octochlorostyrene (OSC). In addition, U.S. Pat. No. 4,284,607 and 3,937,786 are directed to methods wherein the reductant for chlorination is produced in-situ with the aluminous feed material to be chlorinated.

Similarly, U.S. Pat. No. 4,073,872 to Willhoft discloses a process for producing an aluminum product by chlorination procedures involving a carbonation step of heating an intimate mixture of aluminum-containing materials and a solid carbonizable organic material at a temperature of 500°-1000° C. After carbonation, the mixture of aluminous material and carbon distributed therein is subjected to chlorination. Although carbonization in either an oxidizing or reducing atmosphere is taught, this reference similarly does not recognize the problems associated with the presence of chlorinated hydrocarbon precursors and, in fact, teaches addition of such precursors as an alternative to pure chlorine during chlorination.

U.S. Pat. No. 4,459,274 to Loutfy et al. discloses a process for preparing a carbon reductant by partial calcination of coke in an oxidizing atmosphere at a temperature of from 650°-950° C. in order to minimize the chlorinated hydrocarbon precursors present during use of the reductant in chlorination processes. When combined with chlorination processes for aluminum-containing materials and other metal oxides, formation of chlorinated hydrocarbons is minimized.

One disadvantage to carbonaceous reductant produced according to U.S. Pat. No. 4,459,274 is that during continuous operation with a given amount of the reductant, the level of chlorinated hydrocarbons can begin to increase prior to full utilization of the reductant present. A second disadvantage is the relatively moderate surface area obtained due to the partial calcination of the coke. This low surface area limits the removal or precursor hydrocarbon from the core of the coke particles. It would be desirable, therefore, to use a calcination process which produces a high surface area. Not only would high surface area enhance the diffusion and removal of precursor hydrocarbon from the core of coke particles, but the efficiency of the chlorination reaction will also generally increase with higher reductant surface area.

A third disadvantage of the process taught by U.S. Pat. No. 4,459,274 is that it is applicable only to calcinations effected under oxidizing conditions and not applicable to those effected under reducing conditions. Calcination under a strong oxidizing atmosphere, such as air and/or oxygen, results in burning off the coke particles from the outside in, i.e. burning the outer surface, and reduces the particle size. Reducing conditions, on the other hand, where such burn does not occur present the opportunity for an increased porosity without change, i.e. reduction, in particle size.

Accordingly it will be desirable to have a solid carbon reductant with a high surface area for high yield during chlorination, that at the same time would be capable of minimizing chlorinated hydrocarbon production over continuous use. It would also be desirable to have a process for producing such a reductant with a reduced level of chlorinated hydrocarbon precursors by calcination of coke containing volatile hydrogen and hydrocarbons in either an oxidizing or reducing atmosphere.

SUMMARY OF THE INVENTION

The process of this invention produces an improved solid carbon reductant that has a high surface area and low levels of residual hydrogen and hydrocarbons. Thus, use of reductant produced according to the present invention during reductive chlorination processes results in increased chlorination activity with minimized production of chlorinated hydrocarbons ($C_xCl_y$) under both batch and continuous reactor conditions. The processes of the present invention comprise producing a carbon reductant by heating a carbonaceous material containing volatile hydrogen and/or hydrocarbon, such as petroleum coke, to a temperature of from about 650° to about 1150° C., most preferably at a temperature of about 950° C. in the presence of added steam. This use of steam during partial calcination of the reductant material yields unexpectedly improved results with respect to the level of chlorinated hydrocarbon precursors in the reductant and with respect to the formation of chlorinated hydrocarbons during subsequent chlorination processes as compared by reductants prepared by all known processes independent of whether a reducing atmosphere or an oxidizing atmosphere is used during preparation of the reductant.

DETAILED DESCRIPTION OF THE INVENTION

The production of aluminum via aluminum chloride electrolysis has the potential of significant savings and enery consumption over presently used processes. However, the production of anhydrous aluminum chloride from aluminous raw material is a critical problem step. Low temperature and high rate of chlorination are the essential elements for economically acceptable chlorination processes. While green petroleum coke which has been partially calcined by known methods, i.e., in a reducing gas atmosphere or when intimately mixed with the material to be chlorinated, meets these requirements when used as the reductant for chlorination of aluminous materials, it also results in production of chlorinated hydrocarbons. When using an oxidizing gas atmosphere, the level of chlorinated hydrocarbons is reduced, but the surface area of the partially calcined coke is moderate. Also, when used under continuous chlorination reactor conditions, the levels of chlorinated hydrocarbon production can increase prior to efficient and economic utilization of the reductant. By partially calcining the coke in the presence of steam, the resulting partially calcined coke has a high surface area, e.g., approximately 100 m$^2$/gm. The resulting surface area of the partially calcined coke will be dependent upon the type of carbonaceous material used as a feedstock, but will typically be at least about 100 m$^2$/gm and may be as high as 1500 m$^2$/gm. For example, when the starting material is petroleum coke, the high surface area is typically 300 m$^2$/gm. Partially calcined coke prepared according to this invention has a further advantage of substantially reducing the levels of $C_xCl_y$'s produced during chlorination under a broader range of operating conditions.

The partially calcined carbonaceous reductant is prepared according to the processes of the present invention by heating or roasting the carbonaceous material in the presence of added steam. In the preferred embodiment, the steam is used as a fluidizing gas in a fluidized bed reactor, typically of flow rates of steam from about 50 cc/gm to about 2000 cc/gm reductant, preferably 200 cc/gm to about 1000 cc/gm and more preferably about 300 cc/gm to about 800 cc/gm reductant. While the exact amount of steam is not critical, it will in all instances be present in an amount in excess of any steam formed during heating coke from the inherent moisture of undried coke. As used herein the term "added steam" means in the presence of an amount of steam in excess of what would otherwise be present from any inherent moisture.

The partial calcination may also be carried out under oxidizing atmosphere, i.e. by using steam and an oxidizing gas, such as air and/or oxygen or the like. The typical steam flow rate is the same as under reducing atmosphere. The oxidizing gas is typically introduced together with the added steam as it becomes part of the fluidizing gas. The flow rate of the oxidizing gas, such as air, is typically about 5 cc/gm reductant to about 15,000 cc/gm; preferably about 100 cc/gm to about 5000 cc/gm; and more preferably about 400 cc/gm to about 3200 cc/gm. If the partial calcination is carried out under thermally balanced conditions, i.e. the heat required for the endothermic reaction of steam with coke is supplied by the oxidation of coke with air and/or oxygen, the ratio of steam to air will be typically 4.0:1 to about 0.5:1.0 which is within the preferred range.

Calcination according to the present invention is at a temperature of from about 650° C. to about 1150° C., preferably about 850° C. to about 1050° C., and most preferably at about 950° C. The partial calcination should be conducted in the presence of sufficient steam and for a time sufficient to remove substantially all chlorinated hydrocarbon precursors, e.g. volatile hydrogen and hydrocarbons that would lead to chlorinated hydrocarbon formation during chlorination, and/or sufficient to etch the carbon to a surface of approximately 100 m$^2$/gm. Typically the residence time will be from about 10 minutes to about 120 minutes, more typically from about 30 to about 60 minutes.

Carbonaceous material used in the present invention may be coke, typically petroleum coke, treated coal, char and the like or mixtures thereof. The petroleum coke may be fluid or delayed petroleum coke. "Delayed coke" refers to the product of a particular well known coking process as described in U.S. Pat. No. 4,284,607 in which formation of coke is delayed until it reaches the coke drum.

When used herein, the term "partially calcined" is used in a manner well known in the art to refer to a process of heating for a time and temperature insufficient to produce full calcination. Calcination and/or partial calcination is similarly used in a manner described and exmplified in Foulkes et al., "Prospects for Coking May Brighten", The Oil and Gas Journal, Mar. 20, 1978, pp. 85–93 and Kirk-Othmer, Encyclopedia of Chemical Technology, Third Edition, Volume 4, pp. 575–576 incorporated herein by reference.

Aluminous materials advantageously chlorinated in the presence of the partially calcined coke of the present invention include partially calcined aluminum chloride hexahydrate, alumina, bauxite, clay or other aluminum-bearing materials, such as fly ash. Other metal and metalloid oxides which can also be advantageously chlorinated in the presence of the partially calcined coke of the present invention include $TiO_2$, $MgO$, $MoO_3$, $WO_3$, $Ta_2O_5$, $BeO$, $B_2O_3$, $ZrO_2$, $HfO_2$, $Nb_2O_5$, $SiO_2$ and the like.

In a preferred embodiment, aluminum chloride hexahydrate (ACH) is the aluminous material and is derived by acid leaching of clay or other aluminum bearing material according to U.S. Pat. No. 4,465,566 incorporated herein by reference. In another preferred embodiment the ACH is single-stage crystallized ACH prepared and calcined according to the method of U.S. Pat. No. 4,465,659 also incorporated herein by reference. Acid leach-derived ACH may be partially calcined at temperature of from about 200° C. to about 900° C., preferably about 450° C. to about 750° C. to form partially calcined ACH (PCACH), and then chlorinated in the presence of the reductant of the present invention.

Chlorination is typically carried out at temperatures of from about 500° C. and pressures from about 0.1 atm to about 15 atms and preferably carried out continuously. In the preferred embodiment chlorination is effected in a fluidized bed reactor using chlorine gas as the fluidizing gas.

Anhydrous aluminum chloride prepared by chlorination according to the present invention is advantageously utilized in electrolytic cells for production of aluminum. The electrolysis is typically conducted in standard closed monopolar cells or in bipolar cells such as described in U.S. Pat. No. 3,755,099 and U.S. Pat. No. 4,135,994.

The following examples are provided by way of illustration and not by way of limitation.

EXAMPLE 1

Four different types of green petroleum coke were partially calcined at various temperatures, using nitrogen or steam for comparison.

Partial calcination of the coke was carried out in a batch fluidized-bed calciner. Typically, 75–200 grams of green petroleum coke was calcined in a fluidized bed using the selected treatment gas a fludizing media, either nitrogen or steam. Residence time was varied from 10 minutes to 120 minutes, and calcination temperature was varied from 650° C. to 1150° C. The gas flow rate varied between that required to obtain minimum fluidizing and double the fluidizing velocity. Typical nitrogen or steam flow rate was about 2000–3000 cc/minute, i.e., 2 to 3 liter/minute. The results of these calcinations in terms of surface area are shown in Table 1. In addition, a commercially available activiated coke (Witco coke) was treated with steam according to the process of the present invention. The surface of this coke increased from 1400 to 1606 $m^2/g$.

EXAMPLE 2

The various types of coke partially calcined under nitrogen and steam conditions according to Example 1 were used in the chlorination of PCACH at a chlorination temperature of 650° C. In addition, samples of the commercially available Witco coke, as purchased and after stream treatment as described in Example 1, were used as chlorination reductants. The $AlCl_3$ product of each chlorination was analyzed for DCB and total chlorinated hydrocarbon content including DCB and the results obtained are provided in Table I.

TABLE I

| | $N_2$ Calcination | | | Steam Calcination | | |
|---|---|---|---|---|---|---|
| Coke Type | Surface Area $m^2/gm$ | $C_xCl_y$ ppm | DCB ppm | Surface Area $m^2/gm$ | $C_xCl_y$ ppm | DCB ppm |
| Redio Collier Coke | 2 | 1750 | 269 | 100 | 650 | 12 |
| Great Lake Coke | 2 | 4191 | 200 | 90 | 1419 | 123 |
| Arco Houston Coke | 2 | 3522 | 452 | 110 | 2148 | 262 |
| Santa Maria Coke | 2 | 1920 | 153 | 204 | 807 | 28 |
| **Witco Coke | 1400 | 1768* | 51* | 1606 | 496 | 8 |

*No $N_2$ treatent - figures measured are of product as purchased.
**A commercially available activated coke.

EXAMPLE 3

Collier green coke, obtained from Union Oil Company, was crushed and ground and screened to −30 +65 mesh (Tyler). A 125 gram of the −30 +65 mesh portion was calcined in the fluidized bed for 30 minutes at 950° C. and fluidized with 3000 cc/minute steam. About 100 grams of the partially calcined coke was recovered. The recovered partially calcined coke had a surface area of approximately 100 $m^2/gm$. When a portion of the same coke was partially calcined under nitrogen atmosphere without steam, a partially calcined coke with a surface area of a approximately 2 $m^2/gm$ was produced.

EXAMPLE 4

A 20 gram mixture of the partially calcined coke produced from the steam partial calcination of Example 3 and partially calcined aluminum chloride hexahydrate (PCACH) were mixed in a 80:20 ratio and chlorinated in a one inch fluidized bed for 4 hours, taking $AlCl_3$ samples every two hours. The level of $C_xCl_y$'s were as follows:

| $C_xCl_y$ | ppm (weighted average for 4 hours) |
|---|---|
| HCB | 650 |
| DCB | 12 |
| Total $C_xCl_y$ | 662 |

In a comparison test using partially calcined coke, calcined in an oxidizing atmosphere with air only, according to U.S. Pat. No. 4,459,274, the weighted averages of HCB and DCB over 4 hours were approximately 1000 ppm was approximately 50 ppm, respectively.

EXAMPLE 5

The testing parameters of Example 4 were repeated in a continuous feed fluidized bed chlorination reactor. The AlCl₃ produced contained 689 ppm total $C_xCl_y$'s.

EXAMPLE 6

Santa Maria green petroleum coke, obtained from Union Oil Company, was dried, crushed, ground and screened to −30 +65 mesh (Tyler). A 200 gm of the −30 +65 mesh portion was calcined in a fluidized bed for 30 and 60 minutes at 950° C. with 2000 cc/min steam. The recovered partially calcined coke had a surface area of 204 and 179 m²gm, respectively. A similar partial calcination under nitrogen atmosphere without steam produced partially calcined coke with a surface area of approximately 2 m²/gm.

EXAMPLE 7

A 20 gram mixture of the partially calcined coke produced from the steam partial calcination of Example 6 and partially calcined aluminum chloride hexahydrate (PCACH) were mixed in a 80:20 ratio and chlorinated in a one inch fluidized bed for 4 hours, taking AlCl₃ samples every two hours. The level of $C_xCl_y$'s were as follows:

| Reductant Calcination Time (min) | Weight Average $C_xCl_y$, ppm | | |
|---|---|---|---|
| | HCB | DCB | Total |
| 30 | 807 | 28 | 927 |
| 60 | 401 | 30 | 431 |

EXAMPLE 8

Santa Maria green petroleum coke was calcined according to Example 6 but uner oxidizing atmosphere (air) in addition to the steam. Air flow rate varied from 100 cc/min to 2500 cc/min. The partially calcined coke produced after 30 and 60 minutes of calcination for the various air flow rates had surface area in the range of about 110 to 275 m²/gm, the specific data being provided in Table II.

EXAMPLE 9

A 20 gm sample of each partially calcined coke product from the steam/air partial calcinations of Example 8 and partially calcined aluminum chloride hexahydrate (PCACH) were mixed in a 80:20 ratio and chlorinated in a one inch fluidized bed for 3 minutes. The AlCl₃ produced was analyzed and the levels of $C_xCl_y$'s are provided in Table II.

TABLE II

| Coke Calcination Conditions | | | | $C_xCl_y$'s Levels in AlCl₃, ppm | |
|---|---|---|---|---|---|
| Steam (cc/min) | Air (cc/min) | Residence Time (min.) | Surface Area | HCB | DCB |
| 2000 | 250 | 10 | 112 | 214 | 34 |

TABLE II-continued

| Coke Calcination Conditions | | | | $C_xCl_y$'s Levels in AlCl₃, ppm | |
|---|---|---|---|---|---|
| Steam (cc/min) | Air (cc/min) | Residence Time (min.) | Surface Area | HCB | DCB |
| 2000 | 1500 | 10 | 272 | 137 | 10 |
| 2000 | 250 | 30 | 137 | 372 | 50 |
| 2000 | 500 | 30 | 174 | 81 | 7 |
| 2000 | 160 | 60 | 159 | 387 | 42 |
| 2000 | 1500 | 60 | 147 | 190 | 22 |

Although the foregoing invention has been described in some detail by way of illustration and example for purposes of clarity and understanding, it will be obvious that certain changes and modifications may be practiced within the scope of the invention, as limited only by the scope of the appended claims.

What is claimed is:

1. A method of producing a reductant useful in reductive chlorination processes from volatile hydrogen and hydrogen-containing carbonaceous material comprising heating said carbonaceous material in the presence of steam at a temperature of from about 650° C. to about 1150° C. and for a time sufficient to minimize precursors of chlorinated hydrocarbons.

2. A method according to claim 1 wherein said steam is present in an amount of from about 50 cc/gm to about 2000 cc/gm.

3. A method according to claim 1 wherein said time is from about 10 minutes to about 120.

4. A method according to claim 1 wherein said reductant has a surface area of at least about 100 m²/gm.

5. A method according to claim 1 wherein said heating is conducted in the presence of an oxidizing gas.

6. A method according to claim 1 wherein said heating is under reducing conditions.

7. A method of increasing the surface area of a carbonaceous material comprising heating said material to a temperature of from about 650° C. to about 950° C. in the presence of added steam, wherein said carbonaceous material is petroleum coke.

8. A method as claimed in claim 7 wherein said heating is for a time period of at least about 30 minutes.

9. A method of producing a reductant useful in reductive chlorination processes from carbonaceous material containing precursors of chlorinated hydrocarbons, comprising heat treating said carbonaceous material in the presence of steam at a temperature of from about 650° C. to about 1150° C., to reduce the content of said precursors and then measuring the remaining content of said precursors.

10. A method as claimed in claim 9, wherein said steam is present in an amount of from about 50 cc/gm to about 2000 cc/gm.

11. A method as claimed in claim 9, wherein said heating is for a time from about 10 to 120 minutes.

12. A method as claimed in claim 9, wherein said reductant has a surface area of the least about 100 m²/gm.

13. A method as claimed in claim 9, wherein said heating is conducted in the presence of an oxidizing gas.

14. A method as claimed in claim 9, wherein said heating is under reducing conditions.

15. A method as claimed in claim 9, the measuring comprising reacting the carbonaceous material in the presence of chlorine and then determining the content of chlorinated hydrocarbon in a product of the reaction.

* * * * *

UNITED STATES PATENT AND TRADEMARK OFFICE
CERTIFICATE OF CORRECTION

PATENT NO. : 4,836,998

DATED : June 6, 1989

INVENTOR(S) : Raouf O. Loutfy et al

It is certified that error appears in the above-identified patent and that said Letters Patent is hereby corrected as shown below:

| | |
|---|---|
| Col. 3, line 56 | Change "enery" to --energy--. |
| Col. 5, line 34 | Change "temperature" to --temperatures--. |
| Col. 5, line 39 | After "500°C" insert --to about 950°C--. |
| Col. 5, line 61 | Change "fludizing" to --fluidizing--. |
| Col. 7, line 19 | Change "$m^2 gm$" to --$m^2/gm$--. |
| Col. 7, line 44 | Change "uner" to --under--. |
| Col. 7, line 59 | Change "3 minutes" to --3 hours--. |
| Col. 8, line 57 | Change "the" to --at--. |

Signed and Sealed this

Third Day of April, 1990

Attest:

HARRY F. MANBECK, JR.

*Attesting Officer*     *Commissioner of Patents and Trademarks*